(12) United States Patent  
Struble et al.

(10) Patent No.: US 6,898,317 B2  
(45) Date of Patent: May 24, 2005

(54) METHOD AND SYSTEM FOR FIT-TO-FORM SCANNING WITH A SCANNING DEVICE

(75) Inventors: Christian L. Struble, Boise, ID (US); Robert Sesek, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 09/792,853

(22) Filed: May 7, 2001

(65) Prior Publication Data

US 2002/0163653 A1 Nov. 7, 2002

(51) Int. Cl.[7] .................................................. G08K 9/62
(52) U.S. Cl. ...................... 382/209; 382/317; 715/308
(58) Field of Search .............................. 382/173, 176, 382/190, 209, 306, 309, 311, 312, 317, 305; 358/1.2; 707/1–10; 715/505–508

(56) References Cited

U.S. PATENT DOCUMENTS

| | | | | |
|---|---|---|---|---|
| 5,134,669 A | * | 7/1992 | Keogh et al. | 382/318 |
| 5,317,646 A | * | 5/1994 | Sang et al. | 382/175 |
| 5,361,134 A | * | 11/1994 | Hu et al. | 358/296 |
| 5,422,743 A | * | 6/1995 | Farrell et al. | 358/537 |
| 5,459,826 A | * | 10/1995 | Archibald | 715/517 |
| 6,026,187 A | * | 2/2000 | Siegel | 382/213 |
| 6,539,112 B1 | * | 3/2003 | Smith | 382/181 |
| 6,640,009 B2 | * | 10/2003 | Zlotnick | 382/224 |

OTHER PUBLICATIONS

Casey, et al. "Intelligent Forms Processing", IBM Systems Journal, vol. 29, No. 3, pp. 435–450, 1990.*

* cited by examiner

*Primary Examiner*—Daniel Miriam

(57) ABSTRACT

An improved scanning device, such as a Multi-Function Peripheral ("MFP"), and corresponding host system allow a user to scan images for inclusion in a document having pre-defined fields or areas for accepting such scanned images. An electronic form template or parameters for the template are stored in the memory of the MFP or downloaded to the MFP by a host computer. When scanned images are to be inserted into the template, the MFP can access the template or its parameters from memory and ascertain the size and shape of the pre-defined field into which the scanned image must fit. The MFP can then automatically scan the image at an appropriate resolution, size and shape to fit the form template for which it is intended.

28 Claims, 7 Drawing Sheets

METHOD AND SYSTEM FOR FIT-TO-FORM SCANNING WITH A SCANNING DEVICE

FIELD OF THE INVENTION

The present invention relates to the field of scanners, including multi-function peripherals, fax machines, digital senders and other devices that incorporate a scanner. More particularly, the present invention relates to scanners and scanning devices used to generate standard forms where images or text are scanned by the scanner for inclusion in the form.

BACKGROUND OF THE INVENTION

A Multi-Function Peripheral ("MFP") is a single device that serves several functions, including printing. Typically, an MFP can act as a printer, a scanner, a fax machine and a photocopier. MFPs are particularly popular for use in home offices or small businesses. The single machine saves on the expense and the space that would be required to purchase and use a separate device for each function performed by the MFP.

In addition to the MFP, offices, particularly home and small offices, are aided by the use of standardized forms or templates for documents that need to be produced repeatedly. With a standardized form, a template of the document is created electronically. The electronic template file includes all the formatting, text and other elements of the document that remain unchanged from use to use.

Consequently, the user can access the template file when needed, make the changes or add the elements required for that particular use of the document and print the result. In this way, the time required to produce documents based on the standard template is minimized.

In some applications, it may be necessary or desirable to add photographs, images or blocks of text to the standardized form. In such instances, the form template may allot space into which such additional material can be inserted. A common approach to adding photographs and other such material to electronic documents is to scan the photograph or other material using a scanner. The scanned image can then be inserted into the electronic document, including a form template.

Unfortunately, the process of scanning an image and then inserting it into a document is not always simple. A key problem is sizing the scanned image to fit appropriately into the document. This is of particular concern if the scanned image must fit in a pre-defined area or field within an electronic form template. In one approach to this problem, the image is scanned using a scanner and, perhaps, a scanning application on a host computer. The scanned image is then inserted, or pasted, into the electronic document which is opened in a document processing application. Once the image is in the document, it can usually be resized to fit with the other elements in the document.

However, adjusting the size of the scanned image in the document processing application can often result in a low-quality image with poor resolution or a distortion of the image. Alternatively, the image may be cropped in an unwanted fashion when resized in the document. If the image is repeatedly scanned in a trial-and-error fashion to obtain a suitable image, the procedure can become very time consuming.

An alternative to this approach is to know, before scanning, the desired size of the scanned image and set the scanner to generate an image of that size with an appropriate resolution. This approach, however, obviously requires a detailed knowledge of the scanner and the scanning and document processing applications being used. Moreover, this approach is time consuming to execute, particularly if a trial-and-error approach must be used.

Consequently, there is a need in the art for an improved method and system of scanning images (text and/or graphics) that will be inserted into an electronic document, particularly a pre-defined form template, when using a multi-function peripheral.

SUMMARY OF THE INVENTION

The present invention meets the above-described needs and others. Specifically, the present invention provides an improved method and system of scanning images (text and/or graphics) and inserting those images into an electronic pre-defined form template. The present invention is particularly applicable to the use of a multi-function peripheral.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a scanning device, such as a multi-function peripheral, for producing documents based on a form template that incorporates scanned images. The scanning device of the present invention preferably includes a processor; an optical scanner controlled by the processor; and a memory unit accessible to the processor in which the form template or parameters of the form template are stored. The form template includes at least one pre-defined field for accepting a scanned image. The processor controls the scanner to scan an image(s) for inclusion in the form template; the processor controls the scanner to automatically scan the image(s) in accordance with the size or position of the pre-defined field(s). The scanning device may also have a connection to a host system, where the form template or the parameters of the form template are downloaded to the scanning device from the host system.

The scanning device may be a multi-function peripheral which includes an image printing device fed by a paper supply. The image printing device may be controlled by the processor to print the form template after inclusion of the scanned image(s).

The scanning device of the present invention may also have a user interface device. The user interface device may be used to select the form template desired from a menu of templates. The user interface device may also be used to control whether the form template is printed, faxed or stored electronically after completion.

The present invention also encompasses the methods of making and operating the scanning device and related system described above. Specifically, the present invention encompasses a method of producing documents with a scanning device, where the documents are based on a form template that incorporates scanned images into one or more pre-defined fields, the form template or parameters of the form template being stored in or accessible to the scanning device. The method of the present invention is accomplished by scanning an image or images for inclusion in the form template, the scanning being automatically performed in accordance with the size(s) and/or position(s) of the corresponding pre-defined field(s); and incorporating the scanned image or images into the form template. After completion, the form may be printed, faxed or stored electronically. If stored electronically, the method of the present invention may include electronically transmitting the electronic document file.

The method the present invention may also include the steps of (1) prompting a user to scan the image, the prompting being performed with a user interface device on the scanning device or a host system connected to the scanning device; (2) automatically shaping the scanned image in accordance with a shape of the pre-defined field; (3) adding a dynamic data item to the form template; or (4) repositioning, reformatting, reshaping or resizing elements of the form template in accordance with a predetermined position of the scanned image and a size of the scanned image.

The present invention also encompasses the software or computer-readable code required to cause a scanning device and/or the connected host system to operate in the manner described above. For example, the present invention encompasses computer-readable instructions stored on a medium for recording computer-readable instructions, the instructions causing a scanning device to scan an image for inclusion in a document that is based on a form template that incorporates the scanned image in a pre-defined field. The form template is stored in or accessible to the scanning device. The computer-readable instructions cause the optical scanner of the scanning device to scan the image for inclusion in the form template in accordance with the size and/or position of the pre-defined field.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Under the principles of the present invention, an electronic form template is stored in a memory of a scanner or downloaded to the scanner by a host computer or other host device. The scanner may be a discrete peripheral or may be incorporated into another device such as an MFP ("Multi-Function Peripheral"). When scanned images are to be inserted into the template, the scanner can access the template and ascertain the size and shape of the pre-defined field or fields into which the scanned image or images must fit. The scanner can then automatically scan the image or images at an appropriate resolution and size to fit the form template for which the image is intended. Additionally or alternatively, the scanner can determine the positions within the form where the scanned image or images are to be placed and then adapt, reposition or reformat other elements of the form, for example, blocks of text, to fit around the scanned image or images.

As will be understood by those skilled in the art, the present invention can be implemented in any optical scanner or device that incorporates an optical scanner. The MFP is an example of one such device. Another such device is a digital sender. A digital sender is a device that includes an optical scanner which scans images and then creates an electronic file, for example, in .PDF format, that can be sent via e-mail, for example, to another computer or device. The term "scanning device" will be used herein to broadly designated any device that includes a scanner, including, but not limited to, a scanner, an MFP, a digital sender, a photocopier, a fax machine, etc.

Figure 1:
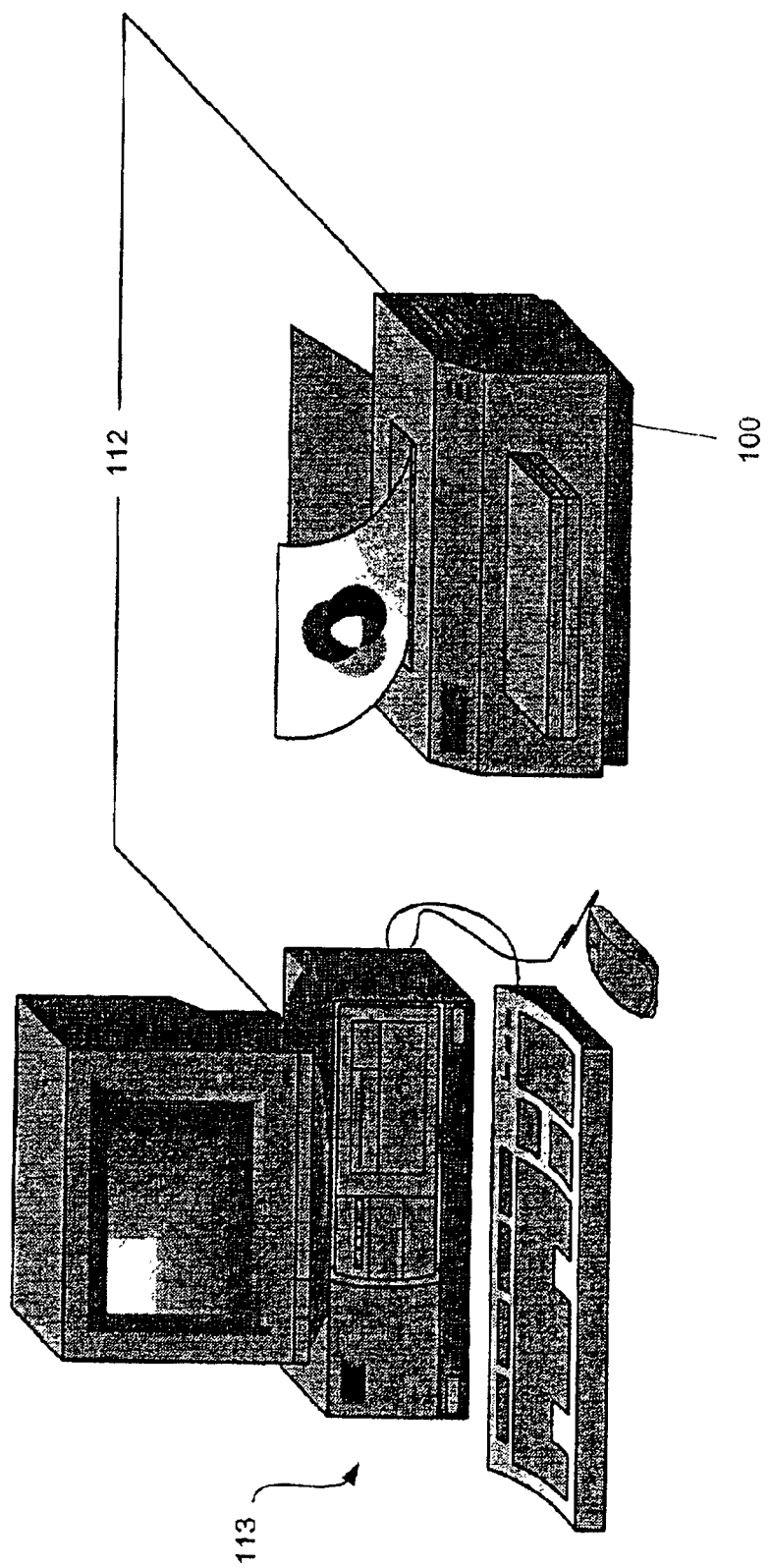
FIG. 1 is a diagram of an embodiment of a Multi-Function Peripheral ("MFP") and host system according to the present invention.

Using the drawings, preferred embodiments of the present invention will now be explained. In a first preferred embodiment, the present invention is implemented in a scanner that is incorporated into an MFP. FIG. 1 illustrates such an exemplary system according to the present invention that includes an MFP (100) that is connected to a host system (113), e.g., a personal computer. The connection (112) between the MFP (100) and the host (113) may be any connection for carrying electronic data from the host (113) to the MFP (100). The connection (112) may be, for example, a direct serial or parallel connection, an Ethernet, a Local Area Network (LAN), a Wide Area Network (WAN), the Internet, a phone line, etc.

In a typical scenario, the host (113) acts as the primary user interface for the MFP (100). If the MFP receives a facsimile, the image may be printed by the MFP (100) and/or displayed on the monitor of the host (113). If the user creates a document on the host (113), that document can then be downloaded to the MFP (100) to be printed or faxed to a designated recipient by the MFP (100).

Figure 2:
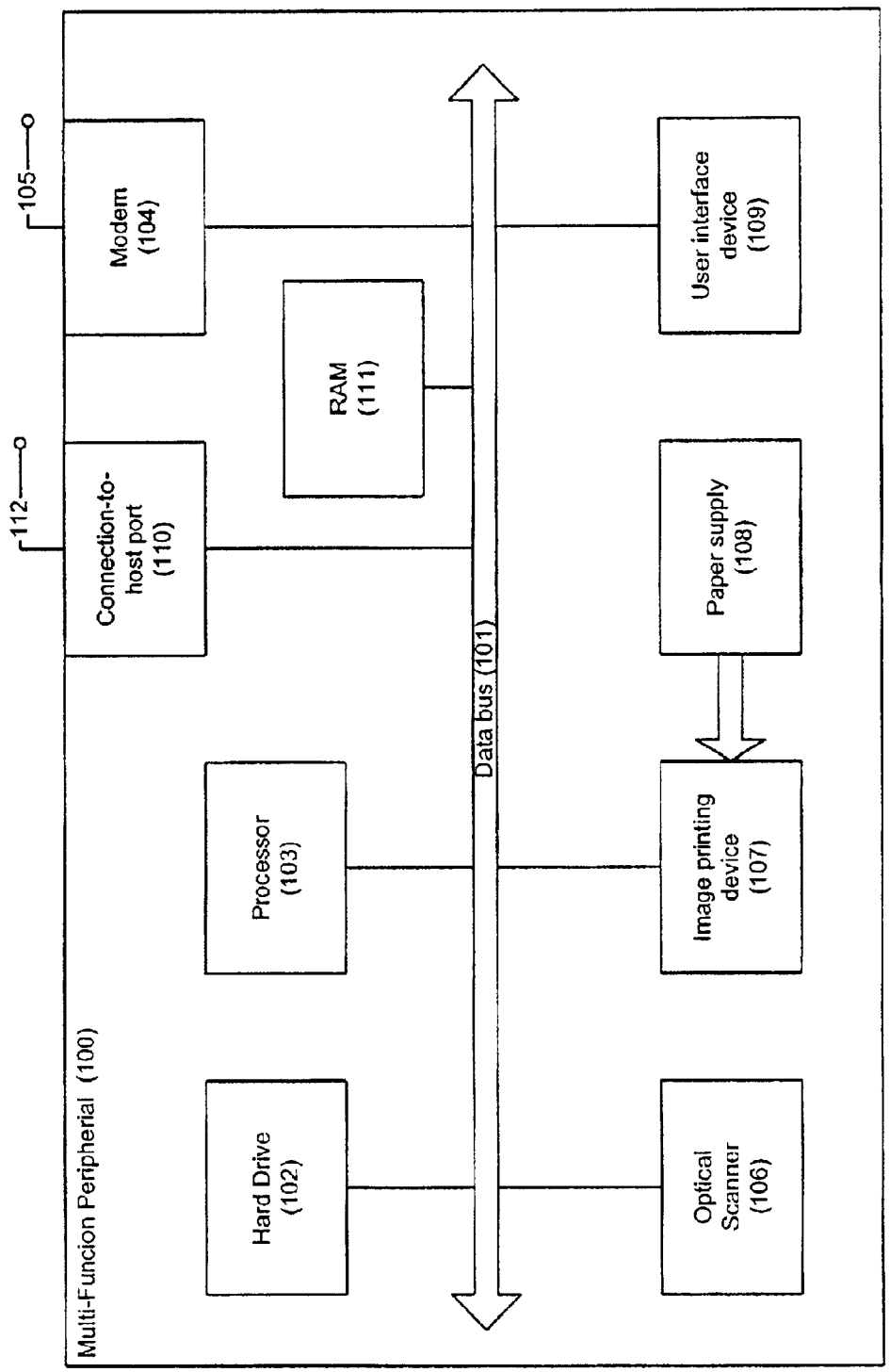
FIG. 2 is a block diagram of a preferred embodiment of an MFP according to the present invention.

FIG. 2 is a block diagram of a preferred embodiment of the MFP (100) of the present invention. As shown in FIG. 2, the MFP (100) may include all the hardware necessary to perform an array of functions. For example, the MFP (100) preferably includes an optical scanner (106) so that documents including text and/or images can be scanned. The scanner (106) may be a flat bed scanner or may have a transport system, such as an automatic document feeder ("ADF"), for moving the paper bearing the document being scanned over the scanner's electronic eye.

The MFP (100) also preferably includes a modem (104) connected to a phone line (105). Consequently, the MFP (100) can accept or send facsimile transmissions over the phone line (105) using the modem (104). The MFP (100) may also send and receive faxes through a LAN, i.e., LANFAX.

The MFP (100) also preferably includes an image printing device (107) which is fed by a paper supply (108). The printing device (107) can, of course, print a print job received from a connected host system (113) in conventional fashion.

Additionally, using the image printing device (107), the MFP (100) can print a scanned image generated by the scanner (106) and, consequently, function as a photocopier. The image printing device (107) can also print the contents of an incoming facsimile transmission received via the phone line (105) and modem (104), thus providing a hardcopy of the received facsimile.

The optical scanner (106) can also scan a document and have the contents electronically transmitted as a facsimile via the modem (104) and phone line (105). Consequently, the MFP (100), with its various component parts, can function as a fax machine, a printer, a photocopier, a digital sender or a scanner.

Additionally, if the MFP is, or includes, a digital sender, the MFP (100) may send and receive electronic document files, for example, in .PDF format, using the modem (104) or port (110).

A processor (103) is provided to control and coordinate the various components and operations of the MFP (100). As used herein, the term "processor" may include, but is not limited to, a microprocessor, a controller, a microcontroller, an Application Specific Integrated Circuit (ASIC) and the like.

The processor (103) will execute appropriate programming from a Random Access Memory ("RAM") unit (111). The programming and other data may be stored in a static memory unit, such as a hard drive (102) and loaded to RAM (111) when needed by the processor (103). A data bus (101) is preferably provided for communication between the various internal components of the MFP (100).

The MFP (100) can be controlled by the user with either the connected host device (113) or a user interface device (109) provided on the MFP (100) housing. While the user interface device (109) may include any components used for receiving input from or conveying information to a user, the user interface device preferably includes, for example, a keypad and a display device. The user interface device (109) may be particularly useful for controlling operations of the MFP (100) that do not require any interaction with the host. For example, copying a document or sending a facsimile.

The MFP (100) also includes a port (110) for connection to a host device (113) or a network. The port (110) can be used to receive the connection (112) from the host computer (113) as illustrated in FIG. 1 or a connection (112) to a network, e.g., a LAN. Consequently, the host (113) can download data and commands to the MFP (100) using the port (110) and connection (112). The host may send the MFP (100), for example, a document to be printed, i.e., a print job, an electronic document to be faxed (including the recipient's fax number) or commands for controlling the operation of the scanner (106).

As noted above, the MFP (100) of the present invention addresses in particular the situation in which the user wishes to produce a printed document based on an electronic form or template that includes material, textual or graphic, that has been scanned and is then incorporated into the document. The completed document may be printed, faxed, transmitted electronically or stored electronically depending on the desires of the user and the capabilities of the MFP or other scanner or scanning device used to create the completed document.

Under the principles of the present invention, the electronic template for the document being generated is preferably stored on the hard drive (102) or other memory device of the MFP (100) or other scanning device. However, the template may be stored on a host (113) or other device and downloaded to the MFP (100) or other scanning device via the connection (112).

With the form template in memory, when scanned images are to be inserted into the template, the MFP (100) or other scanning device can access the template from memory (102, 111) and ascertain the size and/or position of the pre-defined field(s) into which the scanned image(s) must fit. Alternatively, the size and other parameters of the pre-defined field can be communicated to the MFP (100) from the host (113) on which the template is resident. The MFP can then automatically scan the image with the optical scanner (106) at an appropriate resolution, scale and size to fit the form template for which it is intended.

Figure 3:
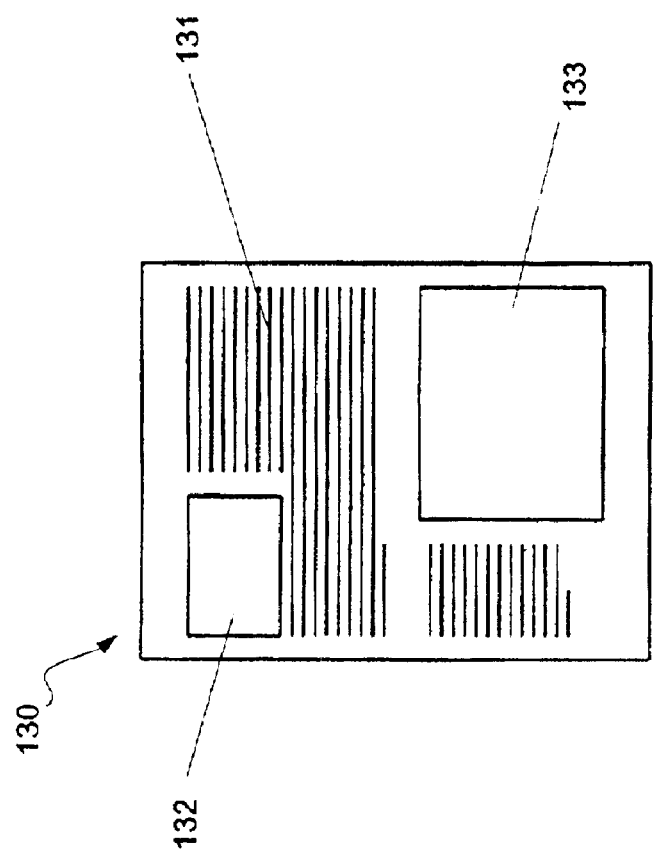
FIG. 3 is an illustration of an exemplary electronic form template.

FIG. 3 illustrates a form template (130). As shown in FIG. 3, the form template (130) will include standard elements that remain the same from use to use. These standard elements are exemplified in FIG. 3 by the text blocks (131). The form may also be a dynamic form that includes data items that will be obtained and added each time the form is completed. For example, a dynamic form may include a date or time stamp. The dynamic form may also include a field for data that is pulled from an available data source, for example, the Internet, and added to the form, such as a price quote for a particular security, etc.

Additionally, the template (130) may include one or more defined areas or fields into which scanned images (graphical and/or textual) are to be inserted. The exemplary template illustrated in FIG. 3 includes a first (132) and second (133) defined field into which such scanned images are to be inserted.

Figure 4:
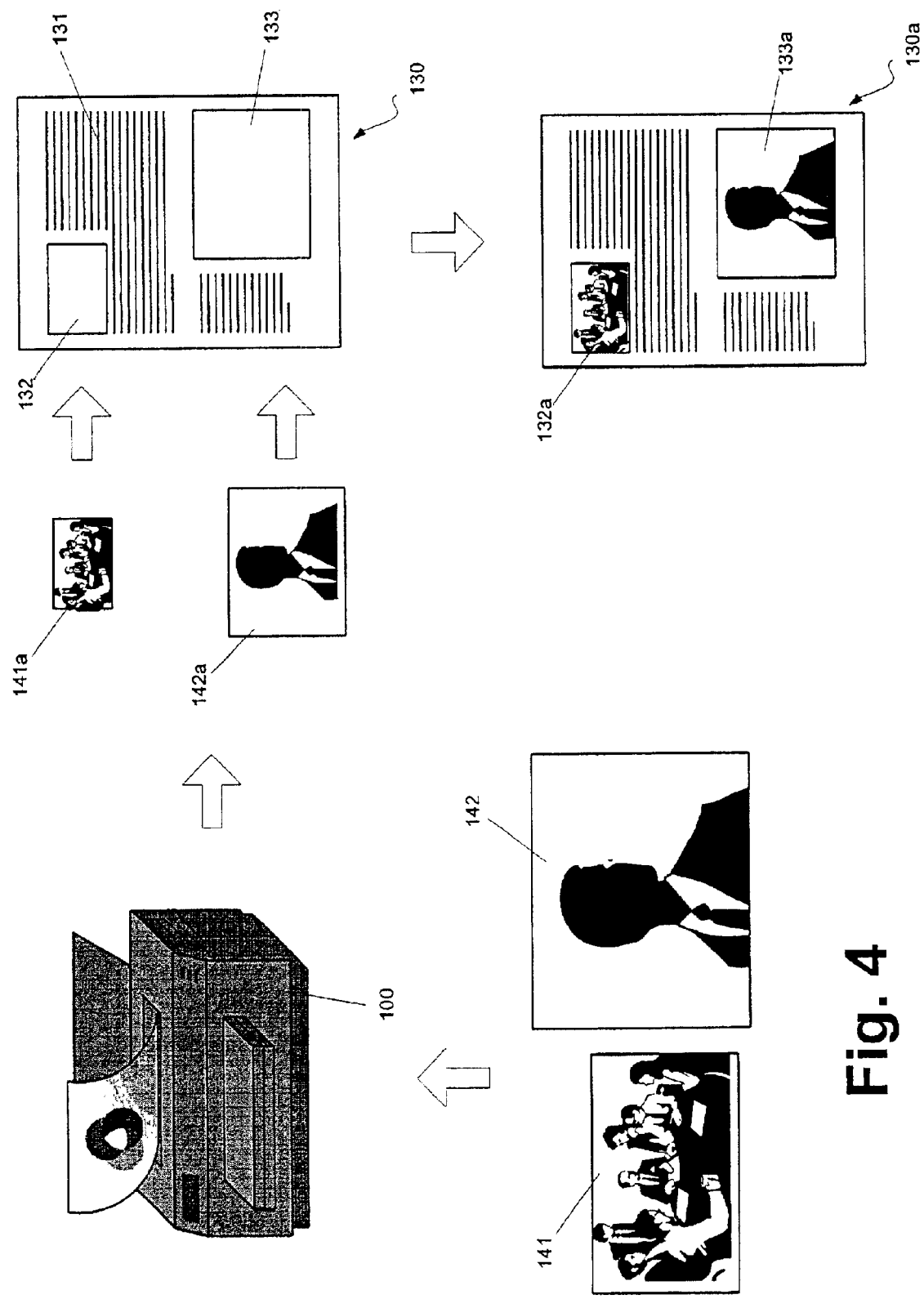
FIG. 4 is a diagram of a preferred embodiment of a system according to the present invention that processes the electronic form template of FIG. 3 and inserts scanned images therein.

FIG. 4 is a diagram illustrating the process of using the MFP (100) to fit scanned elements to a pre-existing form template according to the present invention. As shown in FIG. 4, two images (141 and 142) are to be scanned and included in the form (130) illustrated in FIG. 3. The first image (141) is to be used in the first defined field (132) of the template (130). The second image (142) is to be used in the second defined field (133) of the template (130).

As shown in FIG. 4, the user will interface with the MFP (100) using either the user interface device (109) on the MFP (100) or the host system (113). In either event, the MFP (100) is notified that the user will be scanning images for inclusion in a pre-existing form template. The user may be presented with a menu of the form templates existing on the system and requested to select one. This may all be done with the user interface device (109) on the MFP (100) or from the host system (113).

Once the template is selected, that template will be retrieved from the hard drive (102) of the MFP (100). If the process is being controlled from the host computer (113), the template may be downloaded to the MFP (100) via the connection (112) or the parameters of the field for which the image is being scanned may be communicated to the MFP (100) from the host (113). In either event, the MFP (100) will ascertain the number, size and position of the predefined fields in the template for which images are to be scanned.

The user can then begin scanning the images (141, 142) that are to be included in the form. Preferably, the MFP (100) prompts the user by displaying a request that the user scan the image (141) for the first defined field (132) in the template (130). This request may preferably be displayed on the user interface (109) on the MFP (100). Naturally, the user will be working directly with and at the MFP (100) to scan the desired images (141, 142). However, the prompt(s) may be made with a connected host system (113).

The user then scans the images (141, 142) sequentially with the scanner (106) of the MFP (100). The MFP (100) or host (113) may prompt the user when it is ready to scan the next image, if more than one image is to be included in the form (130).

As shown in FIG. 4, having ascertained the size, position and, perhaps, the shape of the fields (132, 133) into which the scanned images will be placed, the MFP (100) will scan the images (141, 142) and output, electronically, scanned images (141a, 142a) that are the right size and shape for the template fields (132, 133) and that have an appropriate resolution. Optionally, these images could be sized to fit the template fields (132, 133) with or without distortion, i.e., the images could be scanned at an appropriate scale or scanned at a standard scale and the cropped to fit the intended template fields.

The MFP (100) may then automatically insert the scanned images (141a, 142a) into the corresponding fields (132, 133) in the template (130). The result is a completed form (130a) with the scanned images incorporated into the appropriate fields (132a, 133a). The completed document (130a) can then be printed by the MFP (100) for the user, transmitted as a facsimile or stored and/or transmitted as an electronic document file.

In this way, forms that incorporate scanned images can be very quickly produced by the user with the scanned images being appropriately sized and, perhaps, shaped automatically. The user need not take time to edit, resize or crop images to fit the form template.

If the image provided has a shape that does not match the defined field, the MFP (100) will preferably size the scanned image to generally fit the defined field and then start at the center of the scanned image and crop, from the scanned image, an image of the appropriate shape to match the defined field. Alternatively, the MFP (100) or other scanning device may rotate the image being scanned to better accommodate the size of the defined field. Other more sophisticated means of reshaping scanned images may also be employed under the principles of the present invention.

Figure 5:
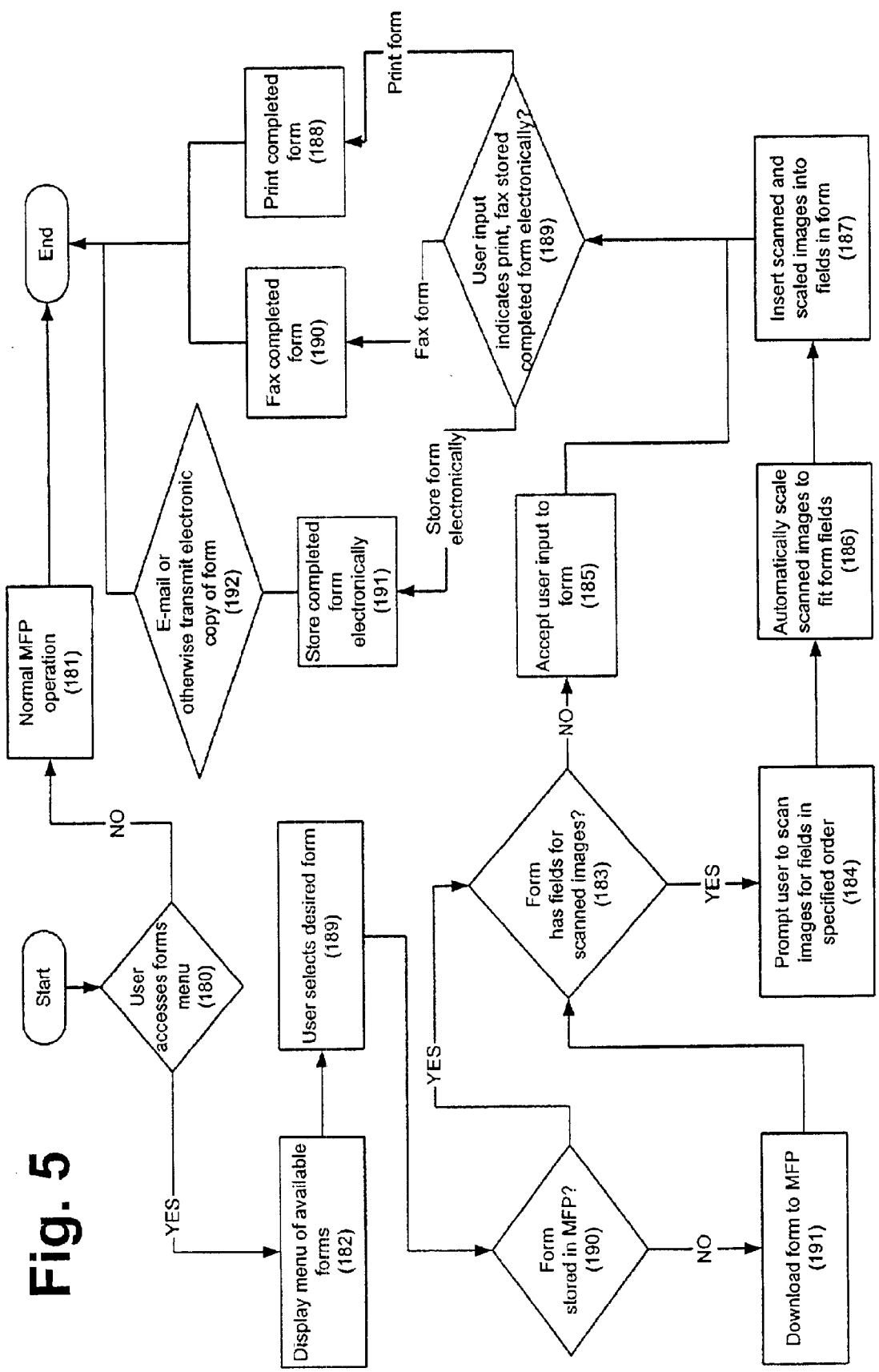
FIG. 5 is a flowchart illustrating a exemplary method of scanning items, such as text or images and automatically sizing the scanned items for use in a pre-defined electronic form template.
Figure 5A:
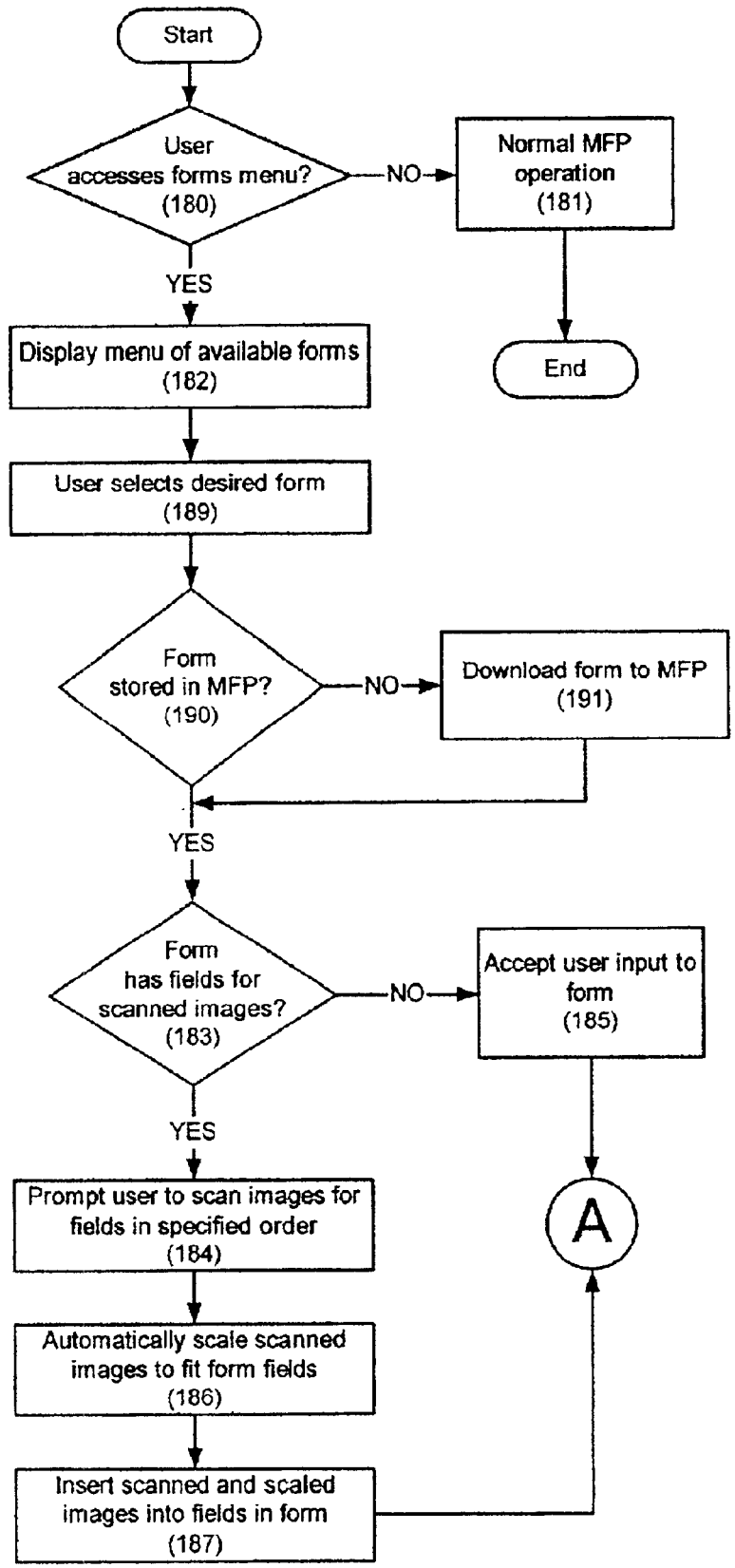
FIGS. 5a and 5b are a flowchart illustrating a preferred method the present invention.

FIG. 5 is a flowchart illustrating a method of the present invention according to a preferred embodiment. This method may be employed in operating the system described above. As shown in FIG. 5a, the method begins when the user accesses a menu of form templates (180). This menu may be resident on either the MFP or the host system. If the user does not access the forms menu, the MFP operates normally (181), performing those functions requested by the user.

If the forms menu is accessed (180), the menu of available forms is displayed (182). This displayed menu may be on a display of the user interface device of the MFP (100) or on the monitor of a host system. The user then selects a desired form from the menu (189). The file for this form is then accessed by the MFP (190). If the user is working from the host system, the host system may then download the selected form to the MFP (191) or send the MFP the parameters defining the fields in the form into which scanned images will be placed.

Having the file or parameters for the form, the MFP will ascertain if the form has any fields or pre-defined areas into which scanned images (graphic or textual) are to be inserted (183). If there are no such elements in the form, the MFP or host system may accept any further user input regarding the form (185) and then output the completed form in a manner specified by the user, as illustrated in FIG. 5b.

Alternatively, if the form calls for scanned input images, the MFP may prompt the user to begin scanning the images, preferably (184) in a specified order. The MFP will then scan the images while automatically scaling and sizing the images to fit the corresponding fields in the form template (186). The MFP will then preferably insert the scanned images directly into the template (187) and then output the completed form in a manner specified by the user.

Figure 5B:
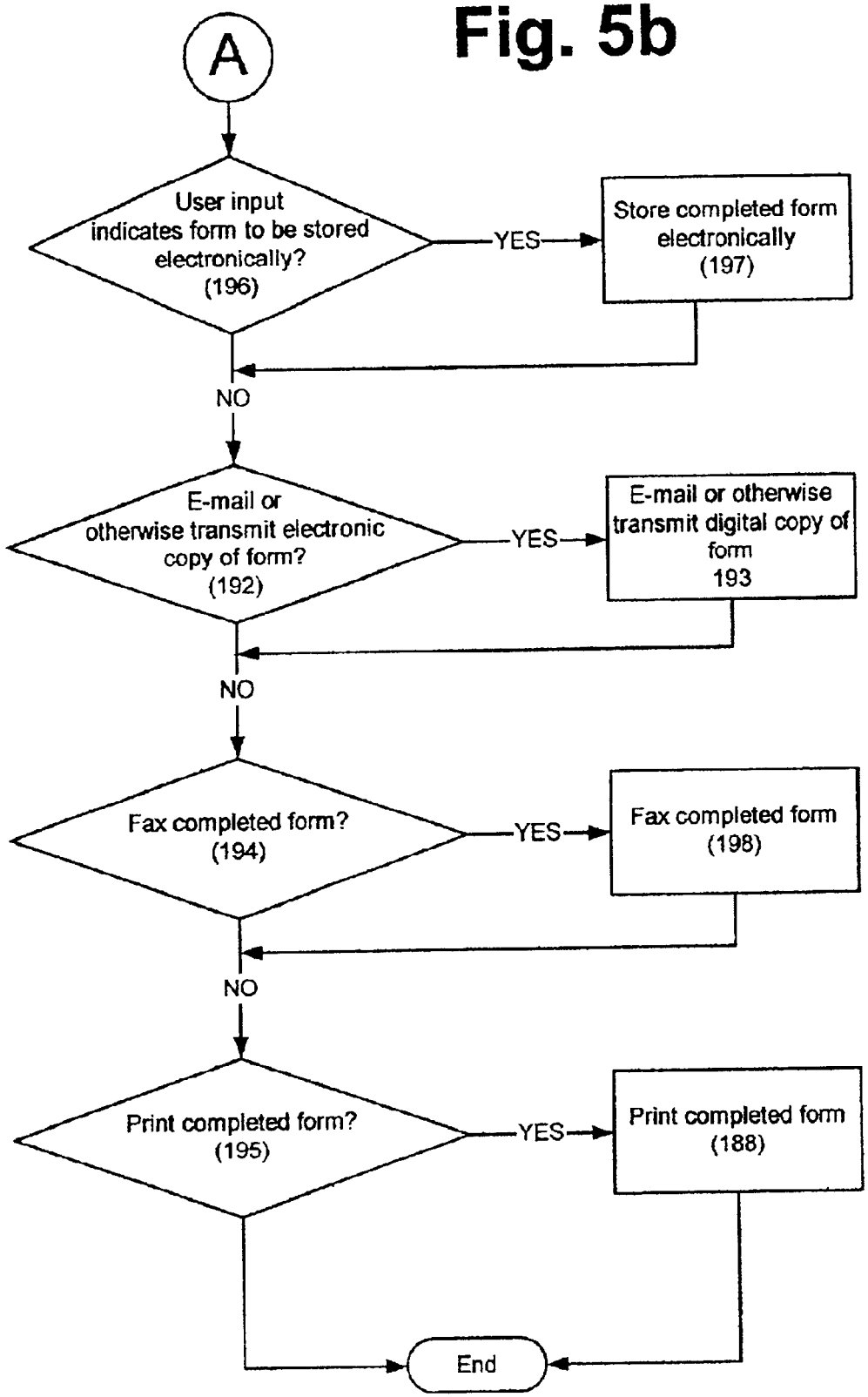

Moving to FIG. 5b, the user may indicate how the completed form is to be output. First, the user should have the option of storing or saving the completed document as an electronic file for later retrieval and use (190, 197). Whether or not the user opts to save the completed document, the user can also decide to e-mail or otherwise electronically transmit the completed document (192, 193). For example, if the MFP is or includes a digital sender, the document file may be e-mailed in, for example, .PDF format. Alternatively, the file may be transmitted electronically back to a host device for storage and/or further electronic transmission. The file may also be transmitted to another printer or peripheral for hard-copy output. For example, the scanning device on which the form is generated may have color scanning capability, but only gray-scale printing capability. Thus, the file may be transmitted to a color printer for color printing.

The user may also have the MFP fax the completed document (194, 198) (if the MFP or scanning device used has a fax capability). Finally, the user may also have the MFP print the completed form (195, 188).

Consequently, the present invention drastically reduces the time required to produce such documents that are based on a form template and include scanned images.

In addition to the system and methods described above, the present invention also encompasses the software required to cause the MFP and/or host system to operate in the manner described above. Specifically, the present invention includes software that causes the MFP and host system to function according to the diagrams of FIGS. 4 and 5. The flowchart of FIG. 5 may be considered a flowchart of the software of the present invention in one preferred embodiment.

As used herein, the term "software" encompasses computer-readable code, written in any language and at any level (e.g. source code, object code, etc.). The term "software" also includes firmware and any additional hard logic (e.g., ASICs, FPGAs, etc.) that may be incorporated into an MFP or host system to provide or support the functionality described herein.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A scanning device for producing documents based on a form template that incorporates scanned images, the scanning device comprising:

a processor;

an optical scanner controlled by said processor; and a memory unit accessible to said processor in which said form template or parameters of said form template are stored, said form template including at least one pre-defined field for accepting a scanned image;

wherein said processor controls said scanner to scan an image for inclusion in said form template, said processor controlling said scanner to automatically scan said image in accordance with a size or position of said pre-defined field.

2. The scanning device of claim 1, where said scanning device is a multi-function peripheral which further comprises an image printing device fed by a paper supply, said image printing device being controlled by said processor to print said form template after inclusion of said scanned image.

3. The scanning device of claim 1, further comprising a connection to a host system, wherein said form template or said parameters of said form template are downloaded to said scanning device from said host system.

4. The scanning device of claim 1, further comprising a user interface device.

5. The scanning device of claim 4, wherein said user interface device is used to select said form template from a menu of templates.

6. The scanning device of claim 4, wherein said user interface device is used to control whether said form template is printed, faxed or stored electronically after completion.

7. A method of producing documents with a scanning device, wherein said documents are based on a form template that incorporates scanned images into one or more pre-defined fields, the form template or parameters of said form template being stored in or accessible to said scanning device, the method comprising scanning an image for inclusion in said form template, said scanning being automatically performed in accordance with a size or position of said pre-defined field.

8. The method of claim 7, further comprising incorporating said scanned image into said form template.

9. The method of claim 8, further comprising printing said form template after inclusion of said scanned image.

10. The method of claim 8, further comprising faxing said form template after inclusion of said scanned image.

11. The method of claim 8, further comprising storing an electronic document file of said form template after inclusion of said scanned image.

12. The method of claim 11, further comprising electronically transmitting said electronic document file.

13. The method of claim 7, further comprising downloading said form template or said parameters of said form template from a host system to said scanning device.

14. The method of claim 7, further comprising prompting a user to scan said image, said prompting being performed with a user interface device on said scanning device or a host system connected to said scanning device.

15. The method of claim 7, further comprising, prior to said scanning, selecting said form template from a menu of templates.

16. The method of claim 7, further comprising automatically shaping said scanned image in accordance with a shape of said pre-defined field.

17. The method of claim 7, further comprising adding a dynamic data item to said form template.

18. The method of claim 7, further comprising repositioning, reformatting, reshaping or resizing elements of said form template in accordance with a predetermined position of said scanned image and a size of said scanned image.

19. A scanning device for producing documents that incorporate scanned images based on a form template, the scanning device comprising:

an optical scanning means;

memory means in which said form template or parameters of said form template are stored, said form template including at least one pre-defined field for accepting a scanned image; and means for controlling said scanning means to scan an image for inclusion in said form template, said means for controlling said scanning means causing said scanning means to automatically scan said image in accordance with a size of said pre-defined field.

20. Computer-readable instructions stored on a medium for recording computer-readable instructions, said instructions causing a scanning device to scan an image for inclusion in a document, wherein said document is based on a form template that incorporates said scanned image in a pre-defined field, the form template or parameters of said form template being stored in or accessible to said scanning device, wherein said computer-readable instructions cause an optical scanner of said scanning device to scan said image for inclusion in said form template in accordance with a size or position of said pre-defined field.

21. The computer-readable instructions of claim 20, wherein said instructions further cause said scanning device to incorporate said scanned image into said form template.

22. The computer-readable instructions of claim 20, wherein said instructions are at least partially incorporated in a print driver on a host system and further cause said host system to download said form template or parameters of said form template to said scanning device.

23. A scanning device for producing documents based on a form template that incorporates scanned images, the scanning device comprising:

a processor;

an optical scanner controlled by said processor; and a memory unit accessible to said processor in which said form template or parameters of said form template are stored, said form template including at least one pre-defined field for accepting a scanned image;

wherein said processor generates scan parameters based on said pre-defined field and then controls said scanner to scan an image for inclusion in said form template, said processor controlling said scanner to automatically scan said image using said scan parameters.

24. The scanning device of claim 23, where said scanning device is a multi-function peripheral which further comprises an image printing device fed by a paper supply, said image printing device being controlled by said processor to print said form template after inclusion of said scanned image.

25. The scanning device of claim 23, further comprising a connection to a host system, wherein said form template or said parameters of said form template are downloaded to said scanning device from said host system.

26. The scanning device of claim 23, further comprising a user interface device.

27. The scanning device of claim 26, wherein said user interface device is used to select said form template from a menu of templates.

28. The scanning device of claim 26, wherein said user interface device is used to control whether said form template is printed, faxed or stored electronically after completion.

* * * * *